(12) United States Patent
McGhee et al.

(10) Patent No.: US 7,356,727 B1
(45) Date of Patent: Apr. 8, 2008

(54) ELECTRONIC DEVICE EMPLOYING EFFICIENT FAULT TOLERANCE

(75) Inventors: LaShawn McGhee, Temecula, CA (US); James P. Gustafson, Irvine, CA (US); Shao-Chun Chen, Aliso Viejo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 10/797,825

(22) Filed: Mar. 10, 2004

Related U.S. Application Data

(60) Provisional application No. 60/453,314, filed on Mar. 10, 2003.

(51) Int. Cl.
*G06F 11/00* (2006.01)

(52) U.S. Cl. .......................................................... 714/2
(58) Field of Classification Search .................... 714/2, 714/5, 6, 8, 7, 42
See application file for complete search history.

(56) References Cited

U.S. PATENT DOCUMENTS

| | | | |
|---|---|---|---|
| 5,261,055 A | 11/1993 | Moran et al. ................ | 395/275 |
| 5,442,771 A | 8/1995 | Filepp et al. ................ | 395/650 |
| 5,479,637 A | 12/1995 | Lisimaque et al. .......... | 395/430 |
| 5,579,522 A | 11/1996 | Christeson et al. .......... | 395/652 |
| 5,590,277 A * | 12/1996 | Fuchs et al. .................... | 714/38 |
| 5,596,738 A | 1/1997 | Pope ............................ | 395/430 |
| 5,598,534 A | 1/1997 | Haas ...................... | 395/200.09 |
| 5,608,910 A | 3/1997 | Shimakura ................... | 395/670 |
| 5,623,604 A | 4/1997 | Russell et al. ............ | 395/200.1 |
| 5,666,293 A | 9/1997 | Metz et al. ............... | 395/200.5 |
| 5,752,039 A | 5/1998 | Tanimura ..................... | 395/712 |
| 5,778,440 A | 7/1998 | Yiu et al. .................... | 711/154 |
| 5,790,974 A | 8/1998 | Tognazzini .................. | 701/204 |
| 5,812,753 A * | 9/1998 | Chiariotti ......................... | 714/6 |
| 5,878,256 A | 3/1999 | Bealkowski et al. ......... | 395/652 |
| 5,960,445 A | 9/1999 | Tamori et al. ............... | 707/203 |
| 6,009,497 A | 12/1999 | Wells et al. ................. | 711/103 |
| 6,038,636 A | 3/2000 | Brown, III et al. .......... | 711/103 |
| 6,064,814 A | 5/2000 | Capriles et al. .............. | 395/701 |
| 6,073,206 A | 6/2000 | Piwonka et al. ............. | 711/102 |
| 6,073,214 A | 6/2000 | Fawcett ....................... | 711/133 |
| 6,088,759 A | 7/2000 | Hasbun et al. .............. | 711/103 |
| 6,105,063 A | 8/2000 | Hayes, Jr. .................... | 709/223 |
| 6,112,024 A | 8/2000 | Almond et al. ............. | 395/703 |
| 6,112,197 A | 8/2000 | Chatterjee et al. .............. | 707/3 |
| 6,126,327 A | 10/2000 | Bi et al. ................. | 395/200.51 |
| 6,128,695 A | 10/2000 | Estakhri et al. ............. | 711/103 |

(Continued)

FOREIGN PATENT DOCUMENTS

CA  2339923  3/2000

(Continued)

*Primary Examiner*—Nadeem Iqbal

(57) ABSTRACT

Disclosed herein is an electronic device capable of providing efficient fault-tolerance update processes by employing a backup memory block used in conjunction with a block-by-block update process, wherein the backup memory block may be employed to store backup content computed using updated contents of a first memory block and contents of unmodified second memory block. The first and second memory blocks may be recoverable following a fault by computations using the content of the backup memory block. Fault-tolerant recovery processes according to an embodiment of the present invention apply the contents of the backup memory block to efficiently recover from faults occurring during update of one of firmware and software in an electronic device.

18 Claims, 5 Drawing Sheets

U.S. PATENT DOCUMENTS

| | | | | |
|---|---|---|---|---|
| 6,157,559 A | 12/2000 | Yoo | | 365/52 |
| 6,163,274 A | 12/2000 | Lindgren | | 340/825.44 |
| 6,198,946 B1 | 3/2001 | Shin et al. | | 455/561 |
| 6,223,301 B1 * | 4/2001 | Santeler et al. | | 714/6 |
| 6,279,153 B1 | 8/2001 | Bi et al. | | 717/11 |
| 6,311,322 B1 | 10/2001 | Ikeda et al. | | 717/1 |
| 6,438,585 B2 | 8/2002 | Mousseau et al. | | 709/206 |
| 6,836,859 B2 * | 12/2004 | Berg et al. | | 714/36 |
| 7,058,849 B2 * | 6/2006 | Erstad | | 714/5 |
| 2001/0029178 A1 | 10/2001 | Criss et al. | | 455/419 |
| 2001/0047363 A1 | 11/2001 | Peng | | 707/104.1 |
| 2001/0048728 A1 | 12/2001 | Peng | | 375/354 |
| 2002/0078209 A1 | 6/2002 | Peng | | 709/227 |
| 2002/0116261 A1 | 8/2002 | Moskowitz et al. | | 705/14 |
| 2002/0131404 A1 | 9/2002 | Mehta et al. | | 370/352 |
| 2002/0152005 A1 | 10/2002 | Bagnordi | | 700/234 |
| 2002/0156863 A1 | 10/2002 | Peng | | 709/217 |
| 2002/0157090 A1 | 10/2002 | Anton, Jr. | | 717/178 |
| 2003/0033599 A1 | 2/2003 | Rajaram et al. | | 717/173 |
| 2003/0037075 A1 | 2/2003 | Hannigan et al. | | 707/500 |
| 2003/0046524 A1 * | 3/2003 | Zimmer et al. | | 713/1 |
| 2003/0061384 A1 | 3/2003 | Nakatani | | 709/245 |
| 2004/0006723 A1 * | 1/2004 | Erstad | | 714/15 |
| 2004/0123282 A1 * | 6/2004 | Rao | | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

ELECTRONIC DEVICE EMPLOYING EFFICIENT FAULT TOLERANCE

CROSS-REFERENCE TO OTHER APPLICATIONS

The present application claims the benefit of priority of U.S. Provisional Patent Application having Ser. No. 60/453,314, filed on Mar. 10, 2003, and hereby incorporates herein by reference the complete subject matter thereof in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Non-Provisional Patent Application having application Ser. No. 10/774,027, filed on Feb. 11, 2004, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs, to introduce new features, or both. Electronic devices, such as mobile handsets, access servers to retrieve update packages that are needed to update firmware and/or software.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in an electronic device having one of firmware and software stored in non-volatile memory therein. The electronic device may comprise a fault-tolerant update agent employing a block-by-block memory update process. The fault-tolerant update agent may be capable of updating one of the firmware and software in the electronic device. The fault-tolerant update agent may be capable of determining at least one last updated memory block in a previous update process during fault tolerant recovery following an interruption in an update process.

In an embodiment according to the present invention, the fault-tolerant update agent may be adapted to provide efficient recovery services using of a backup memory block in non-volatile memory. The backup memory block may be used to store resultant content generated by applying an exclusive or (XOR) transformation to contents of a first memory block and a second memory blocks. The fault-tolerant update agent may be capable of retrieving at least one of the contents of the first memory block by employing the backup memory block and the contents of the second memory block, and the contents of second memory block by employing the backup memory block and the contents of the first memory block.

In an embodiment according to the present invention, the electronic device may further comprise a backup memory block in non-volatile memory, a random access memory (RAM), a first memory block in the non-volatile memory, and a second memory block in the non-volatile memory. The update agent may be adapted to modify contents of the first memory block in RAM. The update agent may be adapted to inject contents of the second memory block into RAM and save contents of the RAM in the backup memory block. The fault-tolerant update agent may be capable of recovering not only modified contents of the first memory block from the contents of the backup memory block employing the contents of the second memory block in non-volatile memory, but also recovering the contents of the second memory block from the contents in the backup memory block by employing modified contents of the first memory block resident in the first memory block in non-volatile memory when an update process is interrupted.

In an embodiment according to the present invention, the update agent being adapted to inject contents may further comprise injecting being executed by employing an exclusive or (XOR) operation to contents of at least two memory blocks.

In an embodiment according to the present invention, the fault tolerant update agent may be adapted to copy the contents of the first memory block into RAM, update the RAM to generate modified contents of the first memory block, XOR the contents of the second memory block into RAM, and copy the contents of RAM into the backup memory block to provide fault tolerance before writing the modified contents of the first memory block from the RAM into the first memory block in non-volatile memory of the electronic device.

In an embodiment according to the present invention, the electronic device may further comprise a memory processing order specifying an order that memory blocks are updated by the update agent. The first memory block and the second memory block may be disposed one of physically and logically in adjacent memory blocks. The first memory block may precede the second memory block in the memory block processing order. The update agent may be adapted to recover the modified contents of the first memory block from the backup memory block by employing the contents of the second memory block during a second attempt to update the electronic device, when update of the first memory block having modified contents of the first memory block in RAM is interrupted due to a fault occurring during a first attempt to update the electronic device.

In an embodiment according to the present invention, recovery of modified contents of the first memory block from the backup memory block may be executed by applying an exclusive or (XOR) operation to contents of the backup memory block and the contents of the second memory block.

In an embodiment according to the present invention, the update agent may be adapted to recover contents of the second memory block from the backup memory block by employing modified contents of the first memory block, during a second attempt to update the electronic device, when update of the second memory block having the modified contents of the first memory block is interrupted due to a fault occurring during a first attempt to update the electronic device.

In an embodiment according to the present invention, the fault tolerant update agent may employ the backup memory block to store and backup computed content and may use the backup computed content to recover modified content of the first memory block and unmodified content of the second memory block following a fault. The backup computed content of the backup memory block may be used to recover from a fault occurring during one of a process of writing updated content to the first memory block and during modification of contents of the second memory block.

In an embodiment according to the present invention, writing to a memory block in the non-volatile memory may be performed by a flash memory erase operation followed by a flash memory write operation. The update agent may be capable of one of diminishing and eliminating a wait period for the flash memory erase operation to be completed before invoking the flash memory write operation. The one of diminishing and eliminating a wait period may be accomplished by invoking the flash memory erase operation prior to computationally modifying or assembling data to be written in RAM. The flash memory erase operation may be one of completed and near completion by an end of a computation, wherein the flash memory write operation may immediately commences.

In an embodiment according to the present invention, the electronic device may comprise at least one of a plurality of mobile electronic devices, and wherein the plurality of mobile electronic devices comprise at least one of a mobile cellular phone handset, personal digital assistant, pager, MP3 player, and a digital camera.

Aspects of the present invention may be found in an electronic device capable of updating one of firmware and software in a fault-tolerant update process employing a fault-tolerant update agent. The electronic device may comprise a first memory block in non-volatile memory, a second memory block in non-volatile memory, a backup memory block in non-volatile memory, and random access memory (RAM). The fault tolerant update agent may be adapted to copy contents of the first memory block into RAM, update the RAM generating a modified contents of the first memory block, XOR contents of the second memory block into RAM, and copy modified contents of RAM into the backup memory block for fault tolerance before writing the modified contents of the first memory block from RAM into the first memory block in the non-volatile memory.

In an embodiment according to the present invention, the electronic device may comprise at least one of a plurality of mobile electronic devices, and wherein the plurality of mobile electronic devices comprise at least one of a mobile cellular phone handset, personal digital assistant, pager, MP3 player, and a digital camera.

Aspects of the present invention may be found in a method of performing fault-tolerant updating of one of firmware and software resident in non-volatile memory in an electronic device. The method may comprise performing a block-by-block update of a plurality of memory blocks in the non-volatile memory of the electronic device. The updated content of each memory block may be backed up in a backup memory block before being written into a corresponding memory block.

In an embodiment according to the present invention, the method may further comprise copying each memory block according to a memory block processing order to RAM, updating the RAM when a memory block was not previously used in an exclusive or (XOR) operation while updating a previous memory block in the memory block processing order, performing XOR operation on an updated memory block in RAM using contents of a next memory block in the memory block processing order, saving contents of the updated memory block from the RAM in a backup memory block in non-volatile memory, programming contents of the RAM to a corresponding memory block in the non-volatile memory, and repeating the copying, updating, performing, saving, and programming until all the memory blocks in the memory block processing order have been updated.

In an embodiment according to the present invention, the method may further comprise performing the XOR operation using a previous updated memory block, and wherein saving contents of the updated memory block is executed when the updated memory block is irretrievable after a fault occurrence from the backup memory block.

In an embodiment according to the present invention, programming contents of the RAM to a corresponding memory block in the non-volatile memory may comprise erasing contents of the memory block in non-volatile memory, waiting for erasing to be completed, and writing modified content into the memory block in non-volatile memory, wherein erasing contents of the memory block in non-volatile memory is initiated before updating contents of the RAM.

In an embodiment according to the present invention, erasing may be initiated on each memory block prior to updating when it is determined that each memory block is retrievable from the contents of the backup memory block, and wherein erasing may be initiated on the backup memory block when it is determined that each memory block is irretrievable from the contents of the backup memory block.

In an embodiment according to the present invention, the method may further comprise recovering update information when it is determined that a fault has occurred during an update process by determining the memory block being updated when the fault occurred and recommencing updating of the memory block determined to have been being updated when the fault occurred.

In an embodiment according to the present invention, recommencing may comprise determining if the memory block being updated when the fault occurred is retrievable from the backup memory block in one of an updated state and an original state, retrieving the memory block being updated when the fault occurred by XORing the contents of the backup memory block with contents of a next block in a memory lock processing order if it is determined that the memory block being updated when the fault occurred is retrievable from the backup memory block in an updated state, retrieving the memory block being updated when the fault occurred by XORing the contents of the backup memory block with contents of a previous updated memory block in the memory block processing order if the memory block being updated when the fault occurred is determined to be retrievable from the backup memory block in an original state, programming the memory block being updated when the fault occurred using one of a retrieved updated memory block and a retrieved original memory block retrieved, and continuing updating memory blocks until all memory block in the memory block processing order have been updated.

In an embodiment according to the present invention, the electronic device may comprise at least one of a plurality of mobile electronic devices, and wherein the plurality of mobile electronic devices comprise at least one of a mobile cellular phone handset, personal digital assistant, pager, MP3 player, and a digital camera.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

DETAILED DESCRIPTION OF THE DRAWINGS

Electronic devices may be adapted to access servers to retrieve updates for updating at least one of firmware and software. An electronic device may be, for example, a mobile electronic device having software/firmware, such as, mobile cellular phone handsets, personal digital assistants (PDA's), pagers, MP3 players, digital cameras, etc. An update may comprise firmware and software updates that modify or change the version of a particular firmware or software installed in the electronic device, for example, upgrading to a newer version, repairing a bug in the firmware/software, etc. An update may also add new services to the electronic device or delete services, as desired by a service provider, device manufacturer, or an end-user.

An electronic device requesting access to a server may transmit an access request to the network using a first type of communication and the network may respond using the same type of communication. Alternatively, the electronic device may transmit an access request to the network using a first type of communication and the network may respond using a different type of communication. For example, the electronic device may transmit a request to the network using a short message service (SMS) and the network may respond to the request using a circuit switched or packet switched communication service, or the reverse may occur.

Aspects of the present invention may be found in a method of changing software in electronic devices, such as, mobile handsets. In an embodiment according to the present invention, updating firmware and/or software in electronic devices may be conducted in fault-tolerant mode. Fault-tolerant techniques may involve efficient usage of resources and time.

Figure 1:
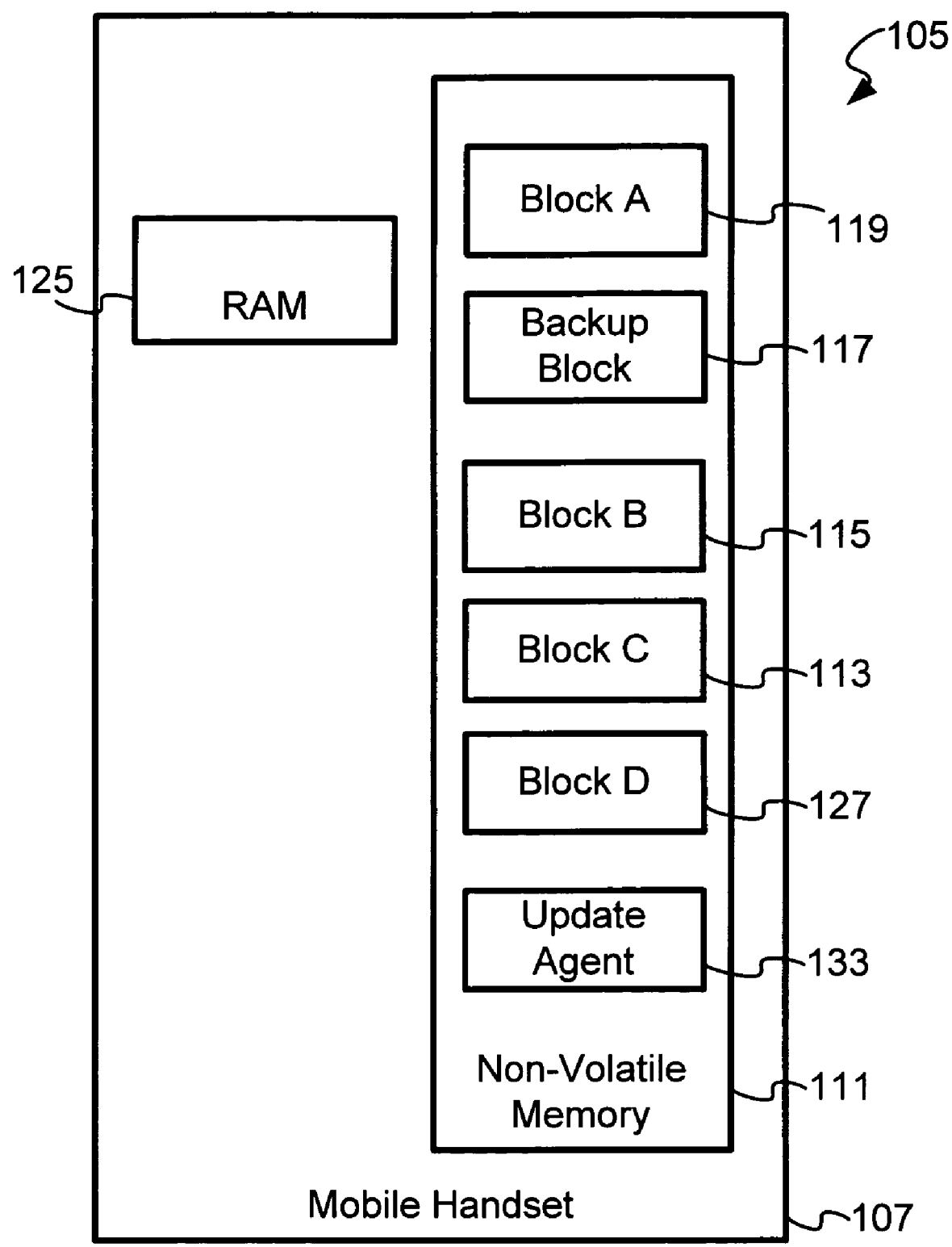
FIG. 1 is a block diagram illustrating an electronic device according to an embodiment of the present invention.

FIG. 1 is a block diagram illustrating an electronic device 105, for example, mobile handset 107 according to an embodiment of the present invention. In FIG. 1, the mobile handset 107 may comprise random access memory (RAM) 125 and non-volatile memory 111. The non-volatile memory may comprise a resident update agent 133 and a plurality of memory blocks, such as for example, memory block A 119, memory block B 115, memory block C 113, and memory block D 127. Addition, the non-volatile memory may also comprise a backup memory block 117.

The mobile handset 107 may provide fault-tolerant update processing in update agent 133 for updating firmware and/or software in the mobile handset 107. Update processing may comprise a block-by-block update (also referred to as a bank-by-bank update processing) using the contents of backup memory block 117. Block-by-block update processing provides the capability of determining which memory block was last updated, wherein upon the occurrence of a fault, is adapted to provide fault-tolerance and efficient recovery of update information.

Non-volatile memory 111 may also be used to store downloaded update packages downloaded from external systems (such as for example, a management server or a delivery server). While updating firmware/software, update agent 133 may employ the contents of backup memory block 117 to provide efficient information recovery. For example, when memory block A 119 is being updated in RAM 125, a modified memory block A may be created. The contents of memory block B 115 may be copied to modified memory block A and saved in backup memory block 117 enabling not only recovery of the contents of modified memory block A if a fault occurs during, for example, a write operation to memory block A 119, (i.e., information write operation being interrupted due to a fault or error), but also enabling recovery of the contents of memory block B 115, during subsequent update activity for memory block B 115 in RAM 125 by employing the contents of modified memory block A resident in (written to) memory block A 119.

Mobile handset 107 may be adapted to provide efficient fault-tolerant processing by employing the contents of backup memory block 117 in conjunction with block-by-block update processing, wherein the contents of backup memory block 117 may be employed to store backup content computed using updated contents of a first memory block (for example, the contents of memory block A 119) and contents of a non-updated second memory block (for example, memory block B 115), both of which may be recovered, following a fault/error, from the contents of backup memory block 117.

Aspects of the present invention may be found in a method for improving the efficiency of fault tolerance in electronic devices having flash memory, for example during an update process. Heuristics based upon the method may be employed in electronic devices, such as mobile handset 107. The method according to an embodiment of the present invention may be orthogonal to various transforms, such as preprocessing, updating, post-processing, etc., that may affect firmware/software. The method according to an embodiment of the present invention provides a faster and more efficient way to apply fault tolerant techniques when updating data in an electronic device comprising, for example, flash memory.

When performing a cable-based update of firmware/software, each memory block of flash memory may be programmed directly, wherein if an interruption occurs, the update process may be restarted again from the beginning. If the update comprises enough data to update the contents of 100 memory blocks of flash memory, then 100 memory blocks are programmed.

When transforming firmware/software in the field, away from wired communication facilities (i.e. wirelessly), writing to flash memory in a fault tolerant manner may employ a two-phase program and a commit process. A backup memory block of flash memory may be reserved for holding data being overwritten or new data to be written. Once it has been determined that the backup memory block is capable of holding the amount of data/information, and after the data/information has been verified as being appropriate update data/information, the memory block requiring programming may be programmed.

If programming is found to be successful, by using a checksum, then the contents of backup memory block may be ignored and reused/overwritten in subsequent updates. However, if the programming is determined to have failed, then the data/information stored/written into the backup memory block may be used to recover from the failure, enabling continuation of the update/modification of the firmware/software. Creating a backup memory block for each memory block of flash memory to be programmed, may involve another programming cycle to be performed for the backup process. For example, if there are 100 memory blocks of update information/data to be programmed during the update process, then 200 memory blocks of memory may be programmed to carry out the update process.

Time is required to program a memory block of flash memory. Two discrete steps may be involved, for example, erasing the contents of a block of memory, and then writing to the block of memory. For each block of memory to be programmed, each of these steps may be performed serially. For example, before each write operation, an erase command may be issued, wherein further processing may be delayed until erasing has been completed, wherein the write operation may begin.

In an embodiment according to the present invention, the method may provide a reduction in the number of blocks of memory being written to during an update of firmware/software by up to 25%. For example, if there are 100 memory blocks of data/information to be programmed, then only 150 memory blocks may be programmed, while still achieving complete fault tolerance. An approach according to an embodiment of the present invention may be referred to as an "Intermittent XOR Backup Bank" approach.

The technique employed in an embodiment of the present invention may use an exclusive-or (XOR) of two known memory banks/memory blocks relative to the banks/memory blocks being programmed. A method according to the present invention may be better understood with reference to FIGS. 2a-2F and FIGS. 3a-3d and the corresponding description set forth below.

Figure 2A:
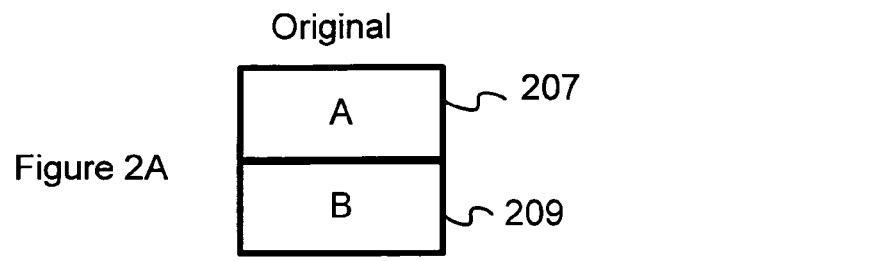
FIG. 2A is a block diagram illustrating two memory blocks of flash memory according to an embodiment of the present invention.

In an embodiment according to the present invention, as illustrated in FIG. 2A, two separate memory blocks of flash memory may be known initially. FIG. 2A is a block diagram illustrating two memory blocks of flash memory according to an embodiment of the present invention. In FIG. 2A, the two memory blocks of flash memory, memory block A 207 and memory block B 209, may be adjacent each other, and may be known in an original version of firmware and/or software in an electronic device, such as for example, mobile handset 107. In FIG. 2A, memory block A 207 may be disposed adjacent to memory block B 209, wherein adjacency may be logical or physical.

Figure 2B:
FIG. 2B is an operation flow diagram illustrating modification/update of a memory block of non-volatile memory according to an embodiment of the present invention.

In an embodiment according to the present invention, as illustrated in FIG. 2B, the contents of memory block A 207 may copied to RAM 125 and modified to a corresponding updated version memory block A 207a. FIG. 2B is an operation flow diagram illustrating modification/update of a memory block of non-volatile memory according to an embodiment of the present invention. In FIG. 2B modification/update of a memory block of non-volatile memory is illustrated wherein after the contents of the memory block have been copied to RAM 125, the contents of memory block A 207 may be modified/updated to memory block A' 207a in RAM 125.

Figure 2C:
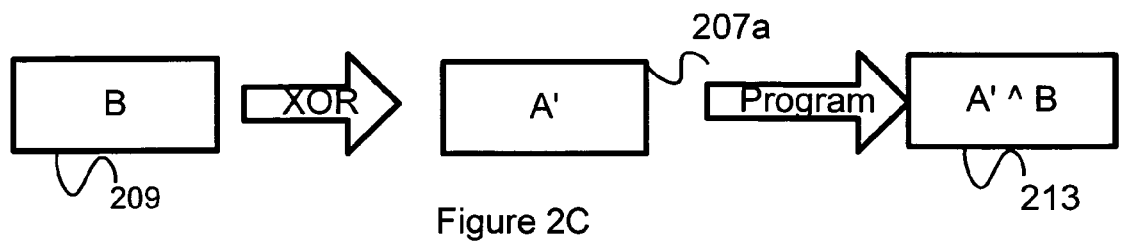
FIG. 2C is an operation flow diagram illustrating transformation of a backup block of memory into a combination of two blocks of memory according to an embodiment of the present invention.

In an embodiment according to the present invention, as illustrated in FIG. 2C, original memory block B 209 and updated memory block 207a may be exclusive-or'd (XOR'd), (in FIG. 2C, the ^ symbol represents the XOR operation), and may then be programmed into backup memory block 117, for example. FIG. 2C illustrates transformation of backup memory block 117 in non-volatile memory into a combination of two memory blocks of memory according to an embodiment of the present invention. In FIG. 2C, modified contents of memory block A' 207a in RAM 125 may be transformed by the XOR operation, into a combination of the contents of memory block A' 207a and the contents of memory block B 209, which may then be programmed into backup memory block 117 for potential recovery of either of the contents of memory block A' 207a given the contents of memory block B 209, or the contents of memory block B 209 given the contents of memory block A' 207a, after a fault/error.

Figure 2D:
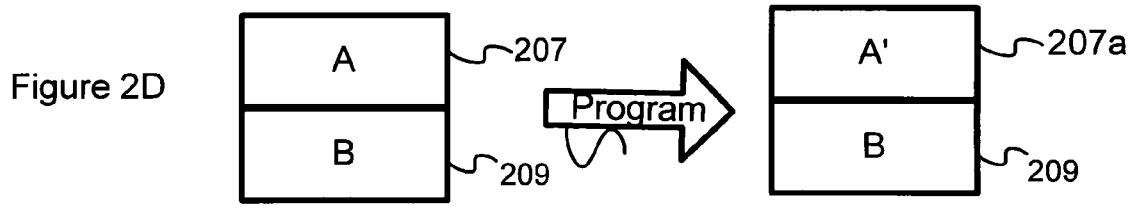
FIG. 2D is an operation flow diagram illustrating programming modified contents of a memory block of non-volatile memory according to an embodiment of the present invention.

In an embodiment according to the present invention, as illustrated in FIG. 2D, memory block A 207 in the original firmware/software may be programmed with updated memory block A' 207a to create a non-valid interim version of flash memory. FIG. 2D illustrates programming modified contents of a memory block of non-volatile memory back into the same memory block according to an embodiment of the present invention. In FIG. 2D, the contents of memory block A 207 modified in RAM 125 to create a memory block A' 207*a*, may be programmed back into memory block A 207.

Figure 2E:
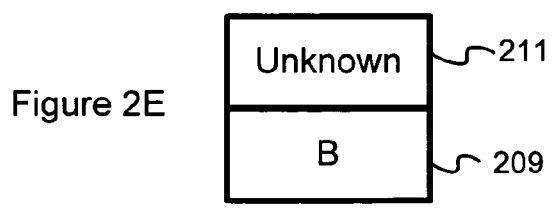
FIG. 2E is an operation flow diagram illustrating potential corruption of a memory block of non-volatile memory when programming of the memory block is interrupted according to an embodiment of the present invention.

If the programming is interrupted, interim flash memory may remain in an unknown state, for example unknown memory block 211 of FIG. 2E. FIG. 2E illustrates potential corruption of contents of a memory block of non-volatile memory when programming of the memory block is interrupted according to an embodiment of the present invention. In FIG. 2E, the contents of memory block A 207 may be in an unknown or corrupted state when programming of memory block A' 207*a* into memory block A 207 is interrupted. In order to repair the contents of unknown memory block 211, the contents of backup memory block 117 may be XOR'd with the contents of memory block B 209 to recover the contents of memory block A' 207*a*, which may then be used for reprogramming.

Figure 2F:
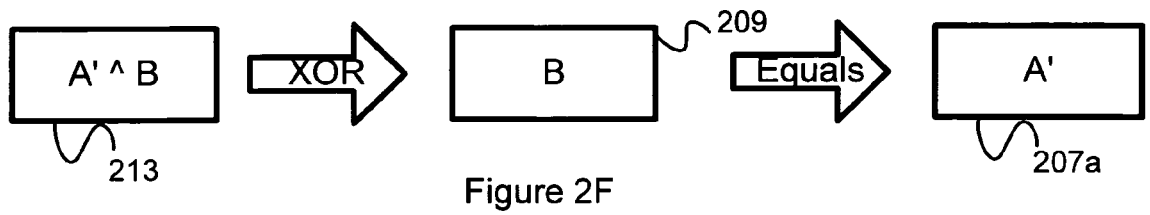
FIG. 2F is an operation flow diagram illustrating capability of recovery from a fault occurring during programming of a memory block of non-volatile memory according to an embodiment of the present invention.

In an embodiment according to the present invention (the contents of memory block A' 207*a* A the contents of memory block B 209) ˆ the contents of memory block B 209=the contents of memory block A' 207*a*. That is, (the contents of memory block A' 207*a* XOR'd with the contents of memory block B 209) XOR'd with the contents of memory block B 209 again produces or equals the contents of memory block A' 207*a*. FIG. 2F illustrates capability of recovery from a fault occurring during programming of a memory block of non-volatile memory by use of the contents of backup memory block 117 storing information from two memory blocks, such that either of the memory blocks may be recovered according to an embodiment of the present invention. In FIG. 2F, backup bank 117 stores the result of the contents of memory block A' 207*a* XOR'd with the contents of memory block B 209, which may be used to retrieve the contents of modified/updated memory block A' 207*a* which may have been corrupted due to an occurrence of a fault (such as a power failure, etc.) while memory block A 207 was being programmed during a previous attempt to update the firmware/software. The contents of the memory block B 209, when XOR'd with the contents of backup memory block 117, may yield the contents of the modified/updated memory block A 207, (i.e., memory block A' 207*a*, which may then be programmed back into memory block A 207.

Figure 3A:
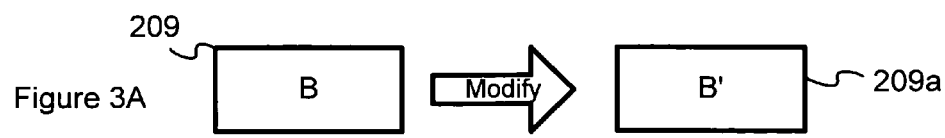
FIG. 3A is an operation flow diagram illustrating updating an original memory block retrieved from a backup memory block following recovery of a modified memory block and an original memory block from the backup memory block according to an embodiment of the present invention.

Assuming that programming was successful (i.e., the result being checked by using a checksum), the contents of memory block B 209, may be copied to RAM 125 and modified/updated creating memory block B' 209*a*. FIG. 3A illustrates updating an original memory block retrieved from a backup memory block following recovery of a modified memory block and the original memory block from the backup memory block according to an embodiment of the present invention. In FIG. 3A, the contents of memory block B 209 may be copied into RAM 125 and modified/updated creating memory block B' 209*a*.

Figure 3B:
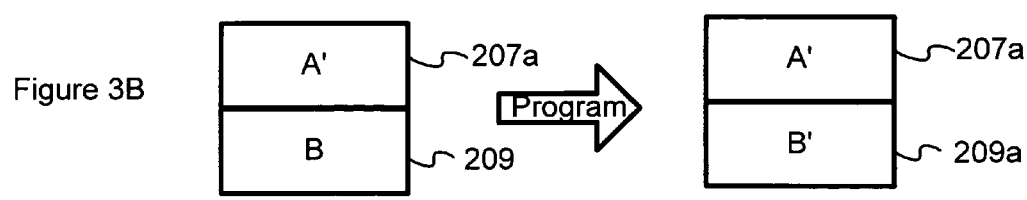
FIG. 3B is an operation flow diagram illustrating programming of a modified memory block into an associated memory block in non-volatile memory after the memory block has been retrieved from a backup bank according to an embodiment of the present invention.

The contents of memory block B 209 in the original firmware/software may be programmed with the contents of memory block B' 209*a* creating an updated version of flash memory in an electronic device. FIG. 3B illustrates programming of a modified contents of the memory block into an associated memory block in non-volatile memory after the contents of the memory block have been retrieved from a backup memory block where the memory block was stored with another updated memory block, according to an embodiment of the present invention. In FIG. 3B, the contents of modified/updated memory block B' 209*a* may be programmed into an associated memory block B 209 in non-volatile memory, after the contents of memory block B 209 have been retrieved from the contents of backup memory block 117, where the contents of memory block B 209 may have been stored with another updated memory block A' 207*a*.

Figure 3C:
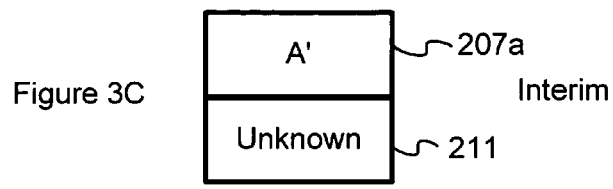
FIG. 3C is an operation flow diagram illustrating an unknown state of a memory block of non-volatile memory when programming is interrupted according to an embodiment of the present invention.

If the programming of memory block B' 209*a* is interrupted, the flash memory my be left in an unknown state, for example as illustrated by unknown memory block 211. FIG. 3C illustrates an unknown state of a block of non-volatile memory when programming is interrupted, according to an embodiment of the present invention. In FIG. 3C, if programming of the contents of modified/updated memory block B' 209*a*, into an associated memory block B 209 in non-volatile memory, is interrupted, then the contents of memory block B 209 may be in an unknown or corrupted state, as illustrated by unknown memory block 211.

Figure 3D:
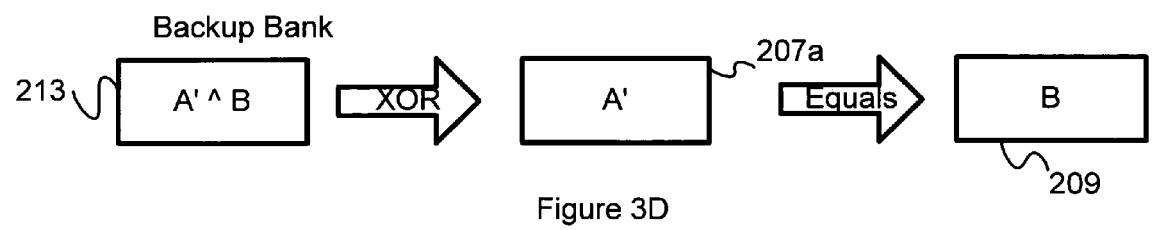
FIG. 3D is an operation flow diagram illustrating recovery of contents of a memory block of non-volatile memory after a failure employing another updated memory block and a backup memory block containing a combination of the updated memory block and the memory block being recovered according to an embodiment of the present invention.

In order to repair the contents of the unknown memory block 211, the contents of backup memory block 117 may be XOR'd with the contents of memory block A' 207*a* to recover the contents of memory block B 209, which may need to be modified again. In an embodiment according to the present invention, (the contents of memory block A' 207*a* ˆ the contents of memory block B 209) ˆ the contents of memory block A' 207*a* =the contents of memory block B 209. That is, (the contents of memory block A' 207*a* XOR'd with the contents of memory block B 209) XOR'd again with the contents of memory block A' 207*a* produces or equals the contents of memory block B 209. FIG. 3D illustrates recovery of the contents of a memory block of non-volatile memory after a failure, employing the contents of another of an updated memory block and the contents of a backup memory block containing a combination of the contents of the updated memory block and the contents of the memory block being recovered according to an embodiment of the present invention. In FIG. 3D, the contents of backup memory block 117 may contain the contents of updated memory block A' 207*a* XOR'd with the contents of corrupted memory block B 209. The contents of memory block B 209 may be recovered by XORing the contents of backup memory block 117 with the contents of memory block A 207 now containing the contents of memory block A' 207*a*.

The method according to an embodiment of the present invention may be extended to an arbitrary number of memory blocks. Additionally, the memory blocks may be processed in any order. The intermittent XOR backup memory block according to an embodiment of the present invention may require extra checksum values and a different recovery process than required for conventional block-by-block update processing. The checksum values may be stored along with the update data/information to modify firmware/software.

Concurrent flash programming may also be supported. Programming flash memory blocks requires two steps, as set forth above. First, a memory block may be erased by issuing an erase command. When the erase process is completed, the contents of memory block may be written with new data. Aspects of the present invention may be found the method illustrated in FIG. 4.

Figure 4:
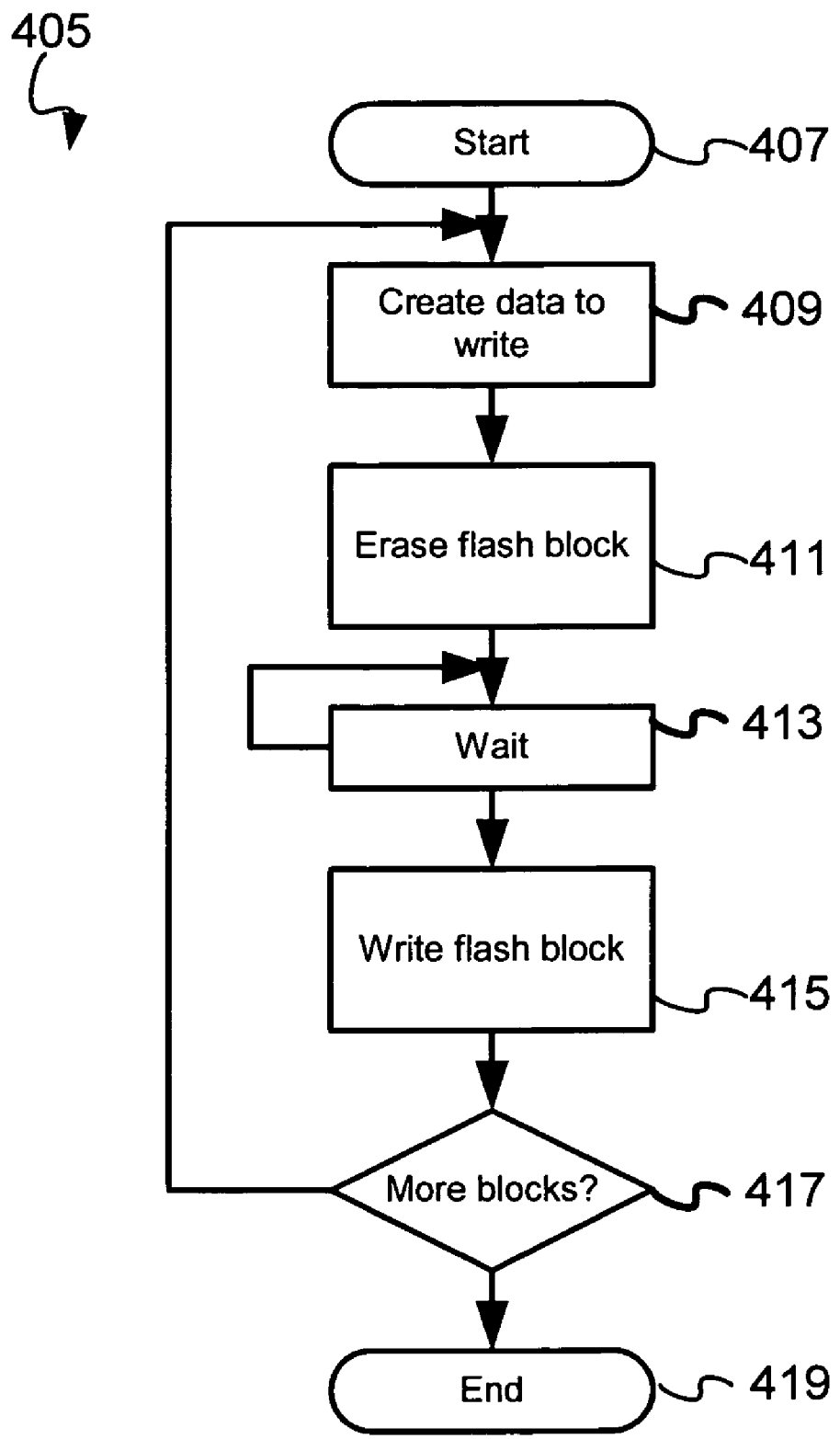
FIG. 4 is a flow chart illustrating a method of flash programming according to an embodiment of the present invention.

FIG. 4 is a flow chart 405 illustrating a method of flash programming wherein an erase command may be invoked after data/information to be stored is computed, thereby causing a write process to wait or be delayed until the flash memory erase process is complete, before the write process to a associated flash memory block may be invoked. In FIG. 4, a method according to an embodiment of the present invention may be implemented to reduce waiting while the erase command/process completes. In flash memory devices, there may be no reason to combine the erase command with the write command. The process may begin a start block 407. At block 409, a create data to write process may be performed, for example, an update process may be applied to memory block data/information. At block 411, an erase command may be issued. The erase command may be issued before block 409, rather than after block 409 as desired. Invoking the erase flash memory block command (block 411) may cause a wait (block 413), wherein the subsequent write flash memory block operation (block 415) may be delayed until the erase process (block 411) completes successfully (as determined by block 413). The method may comprise updating a plurality of memory blocks sequentially and the process may be adapted to determine whether additional memory blocks require update/modification (block 417). The method may terminate at block 419.

Figure 5:
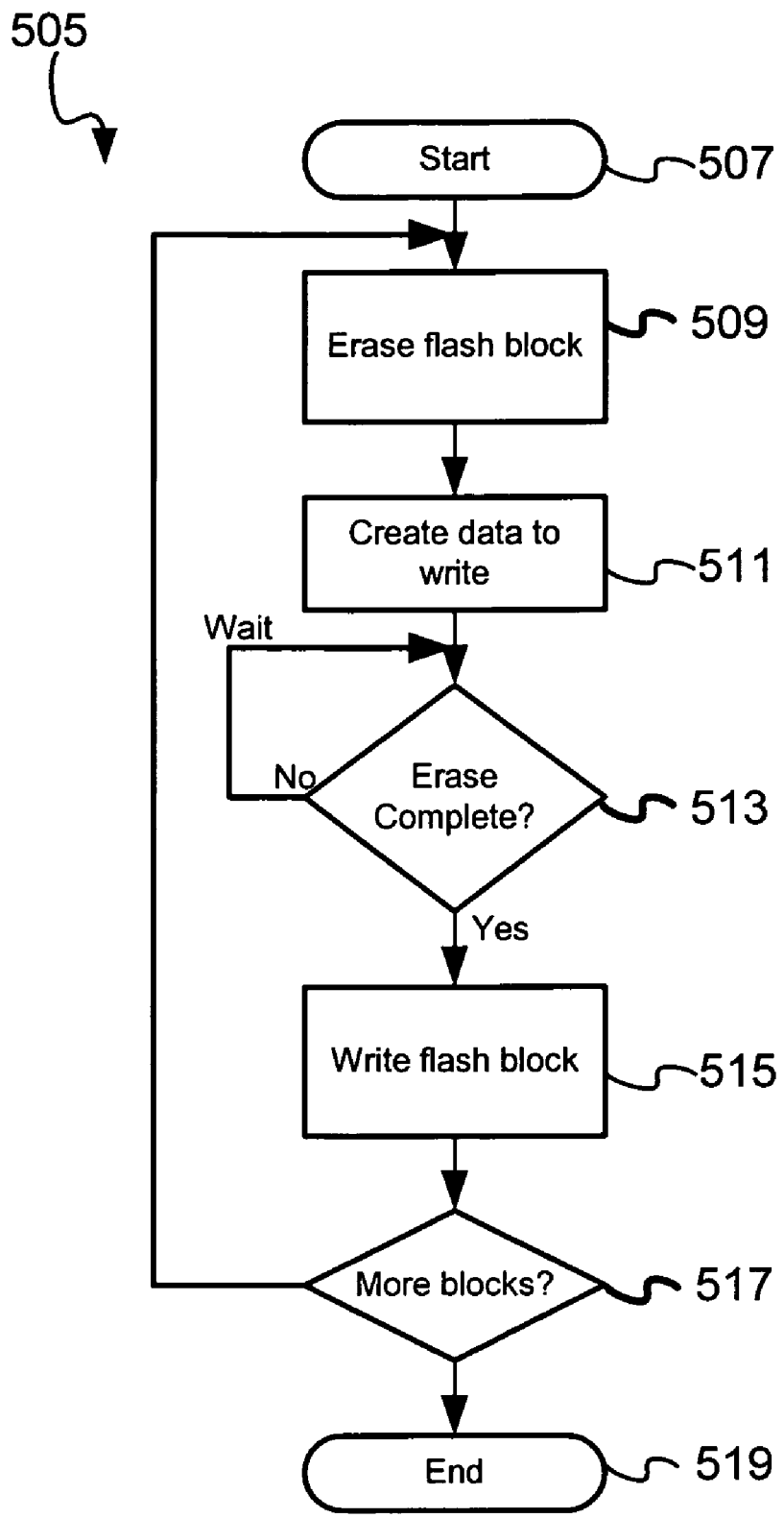
FIG. 5 is a flow chart illustrating a method of flash programming according to another embodiment of the present invention.

FIG. 5 is a flow chart 505 illustrating a method of flash programming wherein an erase command may be invoked before data/information to be stored is computed, in order to minimize, or even eliminate, a wait required for a flash erase command/process to be completed, before subsequent and additional flash memory programming may be invoked. In FIG. 5, the method may be initiated at block 507. At block 509, an erase flash memory block may be initiated before a create data to write operation 511 is invoked to enable completion of the erase process and to minimize and/or eliminate any wait corresponding to the erase process completion. The wait (block 513) may be minimized and the write flash memory block operation (block 515) may be invoked earlier than if the erase were not invoked prior to assembly or creation of data/information to be written to an associated flash memory block. The method may comprise updating a plurality of memory blocks sequentially and the process may be adapted to determine whether additional memory blocks require update/modification (block 517). The method may terminate at block 519.

In an embodiment according to the present invention, the update agent 133 making changes (modifying/updating) the flash memory blocks may need to be aware of discrete calls to both the erase command/process and the write command/process to the flash memory blocks. When evaluating fault tolerance, early issuance of the erase command may not be applicable in every situation, but rather may be selectively employed. When the erase time and write time for a flash memory block are relatively equal, the total time for flash memory programming may optimally be reduce at least by half.

Although a system and method according to the present invention has been described in connection with a preferred embodiment, it is not intended to be limited to the specific form set forth herein, but on the contrary, is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. An electronic device having one of firmware and software stored in non-volatile memory therein, the electronic device comprising:

a fault-tolerant update agent employing a block-by-block memory update process, wherein the fault-tolerant update agent is capable of updating one of the firmware and software in the electronic device, and wherein the fault-tolerant update agent is capable of determining at least one last updated memory block in a previous update process during fault tolerant recovery following an interruption in an update process; and wherein the fault-tolerant update agent is adapted to provide efficient recovery services using a backup memory block in non-volatile memory, the backup memory block being used to store resultant content generated by applying an exclusive or (XOR) transformation to contents of a first memory block and a second memory block, wherein the fault-tolerant update agent is capable of retrieving at least one of the contents of the first memory block by employing the backup memory block and the contents of the second memory block, and the contents of second memory block by employing the backup memory block and the contents of the first memory block.

2. An electronic device having one of firmware and software stored in non-volatile memory therein, the electronic device comprising:

a fault-tolerant update agent employing a block-by-block memory update process, wherein the fault-tolerant update agent is capable of updating one of the firmware and software in the electronic device, and wherein the fault-tolerant update agent is capable of determining at least one last updated memory block in a previous update process during fault tolerant recovery following an interruption in an update process;

a backup memory block in non-volatile memory;

a random access memory (RAM);

a first memory block in the non-volatile memory; and a second memory block in the non-volatile memory, wherein the update agent is adapted to modify contents of the first memory block in RAM, and wherein the update agent is adapted to copy contents of the second memory block into RAM and save contents of the RAM in the backup memory block, and wherein the fault-tolerant update agent is capable of recovering not only modified contents of the first memory block from the contents of the backup memory block employing the contents of the second memory block in non-volatile memory, but also recovering the contents of the second memory block from the contents in the backup memory block by employing modified contents of the first memory block resident in the first memory block in non-volatile memory when an update process is interrupted.

3. The electronic device according to claim 2, wherein the update agent being adapted to copy contents further comprises injecting being executed by employing an exclusive or (XOR) operation to contents of at least two memory blocks.

4. The electronic device according to claim 2, wherein the fault tolerant update agent is adapted to copy the contents of the first memory block into RAM, update the RAM to generate modified contents of the first memory block, XOR the contents of the second memory block into RAM, and copy the contents of RAM into the backup memory block to provide fault tolerance before writing the modified contents of the first memory block from the RAM into the first memory block in non-volatile memory of the electronic device.

5. The electronic device according to claim 4, further comprising a memory processing order specifying an order that memory blocks are updated by the update agent, wherein the first memory block and the second memory block are disposed one of physically and logically in adjacent memory locations, and wherein the first memory block precedes the second memory block in the memory block processing order, and wherein the update agent is adapted to recover the modified contents of the first memory block from the backup memory block by employing the contents of the second memory block during a second attempt to update the electronic device, wherein when update of the first memory block having modified contents of the first memory block in RAM is interrupted due to a fault occurring during a first attempt to update the electronic device.

6. The electronic device according to claim 5, wherein recovery of modified contents of the first memory block from the backup memory block is executed by applying an exclusive or (XOR) operation to contents of the backup memory block and the contents of the second memory block.

7. The electronic device according to claim 6, wherein the update agent is adapted to recover contents of the second memory block from the backup memory block by employing modified contents of the first memory block, during a second attempt to update the electronic device, when update of the second memory block having the modified contents of the first memory block is interrupted due to a fault occurring during a first attempt to update the electronic device.

8. The electronic device according to claim 2, wherein the fault tolerant update agent employs the backup memory block to store and backup computed content and uses the backup computed content to recover modified content of the first memory block and unmodified content of the second memory block following a fault by, wherein the backup computed content of the backup memory block is used to recover from a fault occurring during one of a process of writing updated content to the first memory block and during modification of contents of the second memory block.

9. The electronic device according to claim 2, wherein writing to a memory block in the non-volatile memory is performed by a flash memory erase operation followed by a flash memory write operation, and wherein the update agent is capable of one of diminishing and eliminating a wait period for the flash memory erase operation to be completed before invoking the flash memory write operation, the one of diminishing and eliminating a wait period may be accomplished by invoking the flash memory erase operation prior to computationally modifying or assembling data to be written in RAM, wherein the flash memory erase operation being one of completed and near completion by an end of a computation wherein for the flash memory write operation immediately commences.

10. The electronic device according to claim 1, wherein the electronic device comprises at least one of a plurality of mobile electronic devices, and wherein the plurality of mobile electronic devices comprise at least one of a mobile cellular phone handset, personal digital assistant, pager, MP3 player, and a digital camera.

11. An electronic device capable of updating one of firmware and software in a fault-tolerant update process employing a fault-tolerant update agent, the electronic device comprising:
 a first memory block in non-volatile memory;
 a second memory block in non-volatile memory;
 a backup memory block in non-volatile memory; and
 random access memory (RAM), wherein the fault tolerant update agent is adapted to copy contents of the first memory block into RAM, update the RAM generating a modified contents of the first memory block, XOR contents of the second memory block into RAM, and copy modified contents of RAM into the backup memory block for fault tolerance before writing the modified contents of the first memory block from RAM into the first memory block in the non-volatile memory.

12. The electronic device according to claim 11, wherein the electronic device comprises at least one of a plurality of mobile electronic devices, and wherein the plurality of mobile electronic devices comprise at least one of a mobile cellular phone handset, personal digital assistant, pager, MP3 player, and a digital camera.

13. A method of perform fault-tolerant updating of one of firmware and software resident in non-volatile memory in an electronic device, the method comprising:
 performing a block-by-block update of a plurality of memory blocks in the non-volatile memory of the electronic device, wherein updated content of each memory block is backed up in a backup memory block before being written into a corresponding memory block;
 copying each memory block according to a memory block processing order to RAM;
 updating the RAM when a memory block was not previously used in an exclusive or (XOR) operation while updating a previous memory block in the memory block processing order;
 performing XOR operation on an updated memory block in RAM using contents of a next memory block in the memory block processing order;
 saving contents of the updated memory block from the RAM in a backup memory block in non-volatile memory;
 programming contents of the RAM to a corresponding memory block in the non-volatile memory; and
 repeating the copying, updating, performing, saving, and programming until all the memory blocks in the memory block processing order have been updated.

14. The method according to claim 13, further comprising performing the XOR operation using a previous updated memory block, and wherein saving contents of the updated memory block is executed when the updated memory block is irretrievable after a fault occurrence from the backup memory block.

15. The method according to claim 14, wherein programming contents of the RAM to a corresponding memory block in the non-volatile memory comprises:
 erasing contents of the memory block in non-volatile memory;
 waiting for erasing to be completed; and
 writing modified content into the memory block in non-volatile memory, wherein erasing contents of the memory block in non-volatile memory is initiated before updating contents of the RAM.

16. The method according to claim 15, wherein erasing is initiated on each memory block prior to updating when it is determined that each memory block is retrievable from the contents of the backup memory block, and wherein erasing is initiated on the backup memory block when it is determined that each memory block is irretrievable from the contents of the backup memory block.

17. The method according to claim 16, further comprising:
 recovering update information when it is determined that a fault has occurred during an update process by determining the memory block being updated when the fault occurred; and
 recommencing updating of the memory block determined to have been being updated when the fault occurred.

18. The method according to claim 17, wherein recommencing comprises:

determining if the memory block being updated when the fault occurred is retrievable from the backup memory block in one of an updated state and an original state;

retrieving the memory block being updated when the fault occurred by XORing the contents of the backup memory block with contents of a next block in a memory block processing order if it is determined that the memory block being updated when the fault occurred is retrievable from the backup memory block in an updated state;

retrieving the memory block being updated when the fault occurred by XORing the contents of the backup memory block with contents of a previous updated memory block in the memory block processing order if the memory block being updated when the fault occurred is determined to be retrievable from the backup memory block in an original state;

programming the memory block being updated when the fault occurred using one of a retrieved updated memory block and a retrieved original memory block retrieved; and continuing updating memory blocks until all memory block in the memory block processing order have been updated.

\* \* \* \* \*